US011053991B2

United States Patent
Kuriyagawa

(10) Patent No.: US 11,053,991 B2
(45) Date of Patent: Jul. 6, 2021

(54) PROTECTING WORK MACHINE FROM DAMAGE DUE TO LOCKED STATE

(71) Applicant: HONDA MOTOR CO., LTD., Tokyo (JP)

(72) Inventor: Koji Kuriyagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/995,008

(22) Filed: Aug. 17, 2020

(65) Prior Publication Data
US 2020/0378455 A1 Dec. 3, 2020

Related U.S. Application Data

(63) Continuation of application No. PCT/JP2018/007806, filed on Mar. 1, 2018.

(51) Int. Cl.
*F16D 48/10* (2006.01)
*A01D 69/02* (2006.01)
(Continued)

(52) U.S. Cl.
CPC ............ *F16D 48/10* (2013.01); *A01D 69/025* (2013.01); *A01D 75/182* (2013.01); *A01D 2101/00* (2013.01); *F16D 2500/1102* (2013.01); *F16D 2500/3067* (2013.01); *F16D 2500/30421* (2013.01)

(58) Field of Classification Search
CPC ............. F16D 48/10; F16D 2500/1102; F16D 2500/30421; F16D 2500/3067; A01D 69/025; A01D 75/182; A01D 2101/00
See application file for complete search history.

(56) References Cited

U.S. PATENT DOCUMENTS

| 7,015,662 B2 | 3/2006 | Wakitani et al. |
| 7,666,117 B2 | 2/2010 | Kawakami et al. |

(Continued)

FOREIGN PATENT DOCUMENTS

| JP | 2003293340 A | 10/2003 |
| JP | 2004124710 A | 4/2004 |

(Continued)

OTHER PUBLICATIONS

International Search Report for PCT/JP2018/007806 dated May 22, 2018.
IPRP for PCT/JP2018/007806 mailed Mar. 11, 2020.

*Primary Examiner* — Huan Le
(74) *Attorney, Agent, or Firm* — Thomas | Horstemeyer, LLP

(57) ABSTRACT

A work machine comprises an engine, a work unit configured to be driven by the engine, a clutch provided between an output shaft of the engine and a power shaft of the work unit, and configured to transmit or cut off power from the output shaft of the engine to the power shaft, a sensor configured to detect an engine speed of the engine; and a control unit configured to control the engine and the clutch based on the engine speed of the engine. The control unit predicts, based on the engine speed of the engine detected by the sensor, whether or not the work unit will become locked by a load, and control the clutch to switch over from a transmission state to a cut-off state upon predicting that the work unit will become locked.

10 Claims, 5 Drawing Sheets

(51) Int. Cl.
    *A01D 75/18*     (2006.01)
    *A01D 101/00*     (2006.01)

(56) References Cited

U.S. PATENT DOCUMENTS

| | | |
|---|---|---|
| 2004/0169481 A1 | 9/2004 | Wakitani et al. |
| 2007/0275821 A1* | 11/2007 | Kawakami ......... A01D 34/6812 477/107 |
| 2015/0225027 A1* | 8/2015 | Ertel ................. A01D 42/00 180/53.7 |

FOREIGN PATENT DOCUMENTS

| | | |
|---|---|---|
| JP | 2004266933 A | 9/2004 |
| JP | 2007315455 A | 12/2007 |
| JP | 2009008031 A | 1/2009 |
| JP | 2011200189 A | 10/2011 |
| JP | 2014008027 A | 1/2014 |
| JP | 2014233255 A | 12/2014 |
| WO | 2014002846 A1 | 1/2014 |
| WO | 2019167230 A1 | 9/2019 |

\* cited by examiner

PROTECTING WORK MACHINE FROM DAMAGE DUE TO LOCKED STATE

CROSS-REFERENCE TO RELATED APPLICATION(S)

This application is a continuation of International Patent Application No. PCT/JP2018/007806 filed on Mar. 1, 2018, the entire disclosures of which is incorporated herein by reference.

BACKGROUND OF THE INVENTION

Field of the Invention

The present invention relates to a work machine driven by an engine.

Description of the Related Art

Patent Literature 1 describes an engine-driven work machine, in which a generator can be used as a motor. More specifically, Patent Literature 1 describes a configuration in which, depending on the amount of change in the throttle opening, the generator may be driven by the engine so as to generate electricity, or may be supplied with electricity from a battery, so that the generator functions as a motor to assist the engine.

CITATION LIST

Patent Literature

PTL 1: Japanese Patent Laid-Open No. 2004-266933

When a large load is suddenly applied on a work machine, a work unit or an engine will possibly be stopped. For example, when blades of a mowing machine hit a foreign object such as a rock, the blades of the mowing machine stop. Such a phenomenon is called blade lock. For a work machine such as a snowplow or a cultivator, a sudden application of a large load onto a work unit also stops the work unit and the engine thereof. Such blade lock may damage parts of the engine and the blades, and therefore it is desirable to avoid blade lock if possible.

SUMMARY OF THE INVENTION

The present invention, for example, provides a work machine which may include the following elements. An engine. A work unit is configured to be driven by the engine. A clutch is provided between an output shaft of the engine and a power shaft of the work unit, and is configured to transmit power from the output shaft of the engine to the power shaft and to cut off the transmission of the power. A sensor is configured to detect an engine speed of the engine. A control unit is configured to control the engine and the clutch on the basis of the engine speed of the engine. The control unit includes a predicting unit configured to predict, on the basis of the engine speed of the engine detected by the sensor, whether the work unit will become locked by a load, and a clutch control unit configured to control the clutch to switch over from a transmission state to a cut-off state in response to the predicting unit predicting that the work unit will become locked.

Further features of the present invention will become apparent from the following description of exemplary embodiments (with reference to the attached drawings).

DESCRIPTION OF THE EMBODIMENTS

Figure 1:
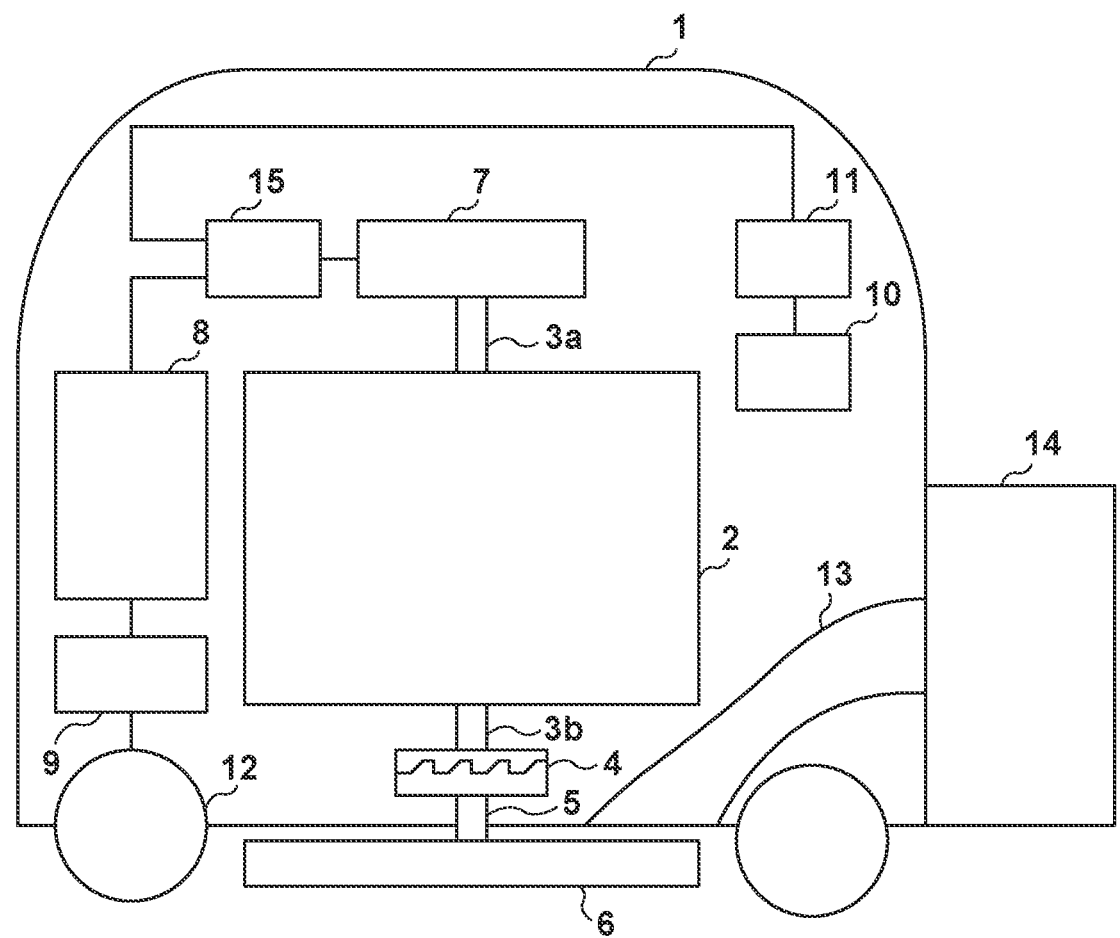
FIG. 1 is a cross-sectional view illustrating a configuration example of a work machine.

Hereinafter, embodiments of the present invention will be described with reference to the attached drawings. Note that the drawings schematically illustrate structures and configurations of the embodiments, and therefore the sizes of members and units illustrated therein are not reflecting real sizes thereof. Furthermore, like reference numerals are given to like elements in the drawings, and redundant description thereof is simplified or omitted herein.

Work Machine

FIG. 1 is a cross-sectional view of a work machine according to one embodiment. In this embodiment, a mowing machine 1 is adopted as one example of the work machine. The mowing machine 1 may be any one of a remote type that is remotely operated by a user, an autonomous type that does not require user's operation, a push type that is pushed from behind by a user walking behind the mowing machine 1, or a ride type that is driven by a user on the mowing machine 1.

The mowing machine 1 includes an engine 2. The engine 2 includes a crank shaft 3a protruding upward (backward) with respect to the engine 2, and a crankshaft 3b protruding downward (frontward) with respect to the engine 2. The crankshafts 3a and 3b are connected with each other or integrated together inside the engine 2, thereby being configured to rotate together. The crankshaft 3b is an output shaft of the engine 2.

A clutch 4 is provided between the crankshaft 3b and a power shaft 5 of a work unit, and is a clutch configured to transmit or cut off power from the crankshaft 3b to the power shaft 5. The clutch 4 may be any clutch such as an electromagnetic clutch, as long as the clutch can be switched between a transmission state and a cut-off state by a control unit 10. Blades 6 are one example of the work unit, and include blades (cutter blades) for mowing lawns, which is a work target. The blades 6 are driven and rotated by the engine 2, thereby mowing the lawns. The mowed grass is pushed to a shooter 13 by an air flow generated by the rotation of the blades 6, and collected in a collecting unit 14 via the shooter 13.

A BSG 7 is a power generator/motor for starting the engine 2 by driving the crankshaft 3a of the engine 2 and for generating electricity by being driven by the started engine 2. The word "BSG" stands for belt starter generator. The BSG 7 is configured to transmit power to the crankshaft 3a via a transmission mechanism such as a belt or gear, and to receive power from the crankshaft 3a via the transmission mechanism. A power supply circuit 15 includes circuits for converting an alternating current generated by the BSG 7 into a direct current, and charging a 48-V battery 8 or 12-V battery 11 with the direct current (an ACDC converter, an inverter, and a DCDC converter). As such, the 48-V battery 8 and the 12-V battery 11 are configured to be charged with the electricity generated by the BSG 7 when the BSG 7 functions as the power generator. The 48-V battery 8 is configured to supply electricity to travel motors 9. The travel motors 9 are configured to drive and rotate respective wheels 12. Moreover, the 48-V battery 8 is one example of a battery for supplying electricity to the BSG 7 when the BSG 7 functions as the motor. The control unit 10 may be configured to drive the engine 2 by supplying electricity to the BSG 7 from the 48-V battery 8 so as to start the engine 2 (starter function) or so as to assist the engine 2 after the engine 2 is started (torque assisting function). The 12-V battery 11 is configured to supply electricity to the control unit 10.

Control System

Figure 2:
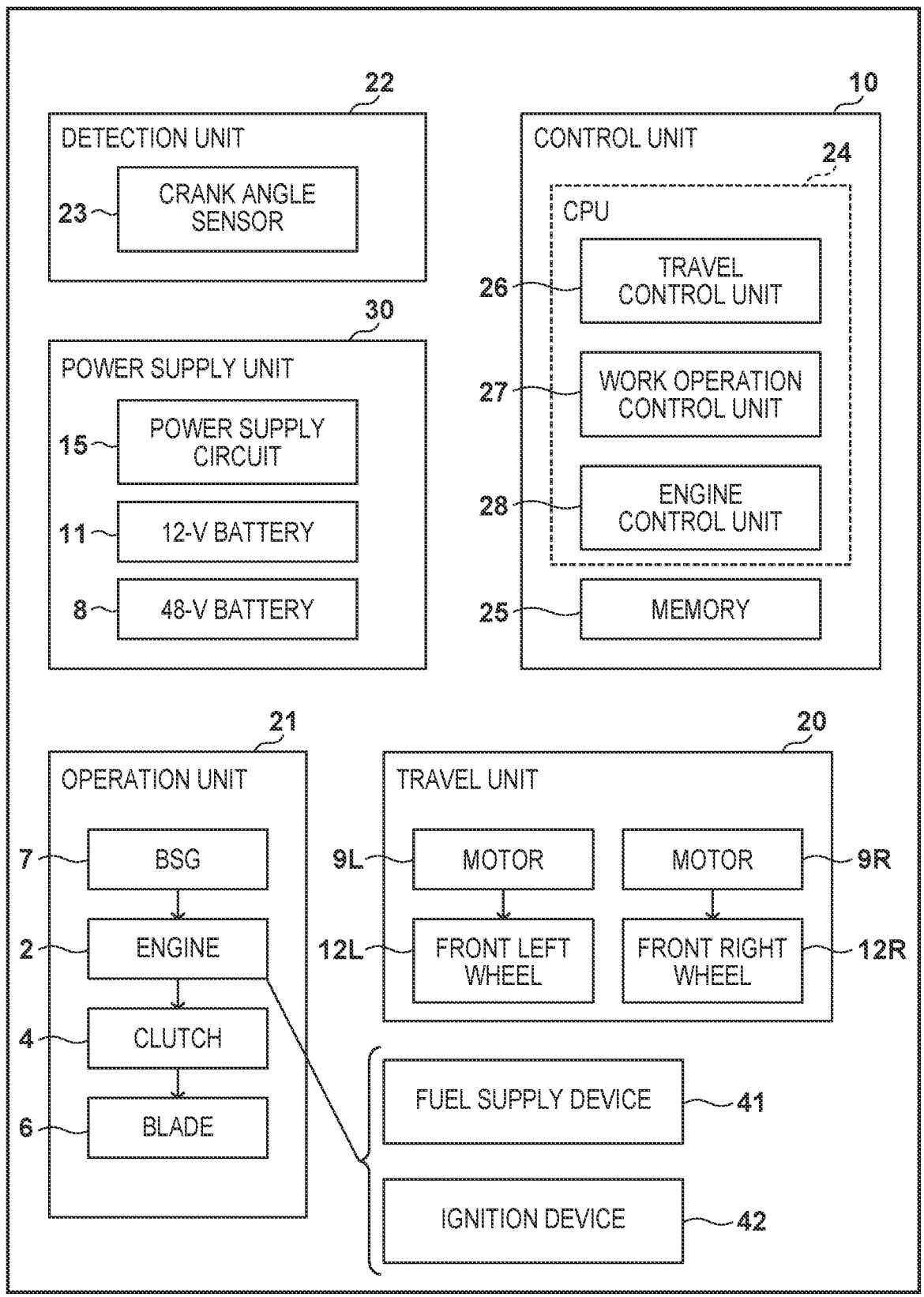
FIG. 2 is a block diagram illustrating a control system for the work machine.

FIG. 2 illustrates a control system for the work machine. The control unit 10 is a control circuit board that includes a CPU 24, and a memory 25 such as RAM and ROM. Note that the CPU 24 is a processor circuitry that may include one or more processors, and/or one or more CPU cores, ASIC (application specific integrated circuits) and/or FPGA (field programmable gate array), and/or one or more combinations of them. The ROM of the memory 25 stores a control program or the like therein. The CPU 24 includes a travel control unit 26, a work operation control unit 27, and an engine control unit 28. The travel control unit 26 is configured to control a travel unit 20 so as to cause the mowing machine 1 to travel. The travel unit 20 may include a travel motor 9L for driving a wheel 12L on a front-left side portion of the mowing machine 1, and a travel motor 9R for driving a wheel 12R on a front-right side portion of the mowing machine 1. Note that, instead of or together with the wheel 12L on the front left side and the wheel 12R on the front right side, the travel motors 9L and 9R may be configured to drive a wheel provided on a rear-left side of the mowing machine 1 and a wheel provided on a rear-right side of the mowing machine 1, respectively. The configuration in which the travel motors 9L and 9R rotate the different wheels 12 respectively gives the mowing machine 1 the ability to turn. For example, when the rotation speed of the wheel 12L is slower than that of the wheel 12R, the mowing machine 1 turns left. The mowing machine 1 also turns when the wheel 12L and the wheel 12R rotate in different rotation directions. The work operation control unit 27 is configured to control an operation unit 21. The operation unit 21 includes the BSG 7, the engine 2, the clutch 4, and the blades 6. The engine control unit 28 is configured to control a fuel supply device 41 so as to supply or not to supply fuel to the engine 2 and to control an ignition device 42 to ignite an air-fuel mixture compressed inside a cylinder of the engine 2.

A power supply unit 30 includes the power supply circuit 15, the 12-V battery 11, and the 48-V battery 8. The voltages supplied from the 12-V battery 11 and the 48-V battery 8 are just examples. The 12-V battery 11 and the 48-V battery 8 may be integrated into one battery.

A detection unit 22 includes a crank angle sensor 23 configured to detect a rotation angle (crank angle) of the crankshaft 3b of the engine 2. The engine control unit 28 is configured to detect or calculate out an engine speed of the engine 2 on the basis of a pulse signal outputted from the crank angle sensor 23. The crank angle sensor 23 may be referred to as an engine speed sensor, because the crank angle sensor 23 is capable of detecting the engine speed of the engine 2 indirectly.

Figure 3:
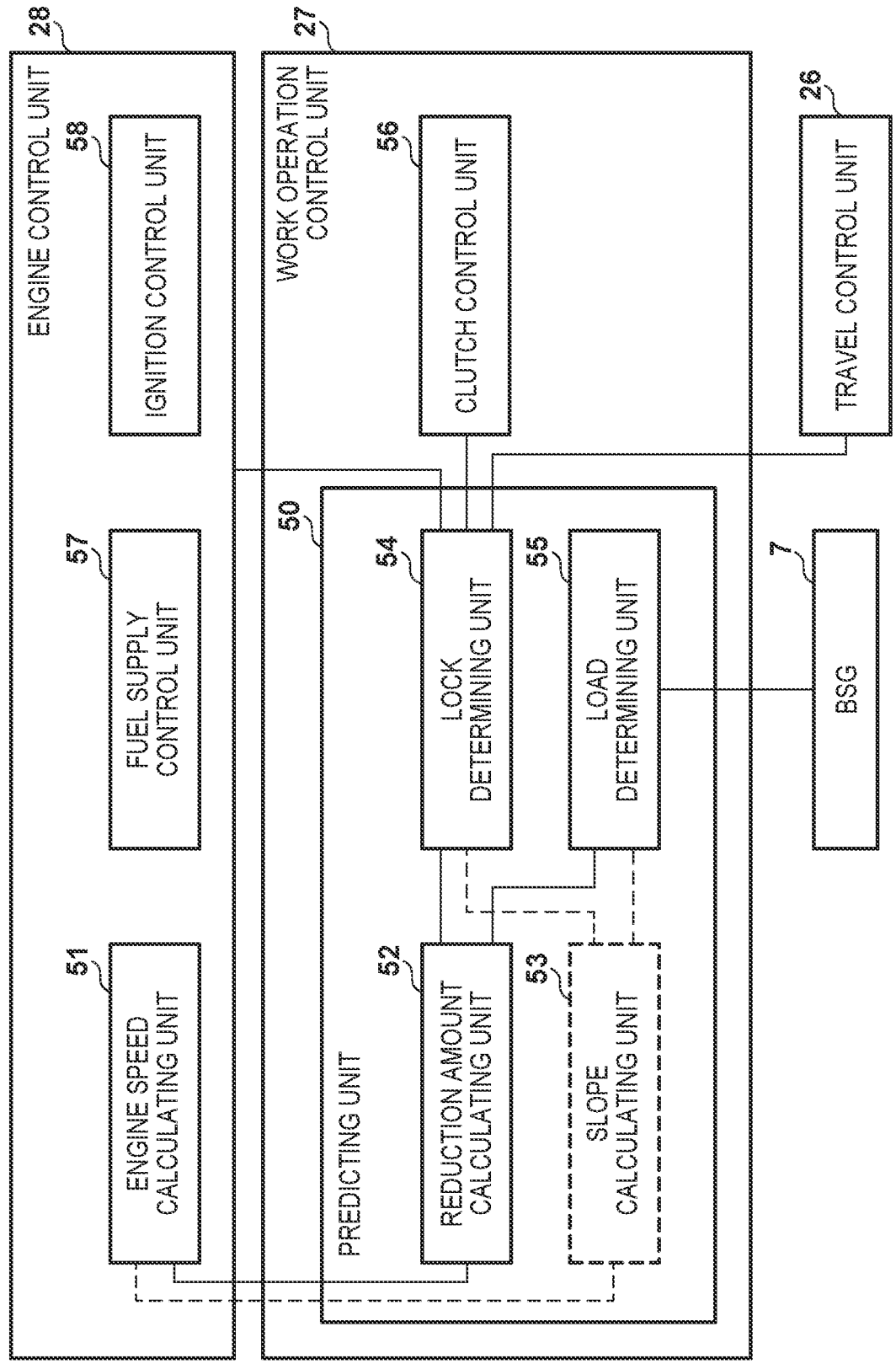
FIG. 3 is a block diagram illustrating a control system for the work machine.

FIG. 3 illustrates details of the work operation control unit 27 and the engine control unit 28. The engine control unit 28 includes an engine speed calculating unit 51 configured to calculate out the engine speed of the engine 2 on the basis of the pulse signal outputted from the crank angle sensor 23. A fuel supply control unit 57 is configured to control a ratio of the fuel and air in the air-fuel mixture (air-fuel ratio) so as to be a predetermined value on the basis of an oxygen concentration detected by an O2 sensor or the like. The ignition control unit 58 is configured to control ignition timing of the ignition device 42 on the basis of the pulse signal outputted from the crank angle sensor 23. The engine control unit 28 may be configured to adjust a target engine speed of the engine 2 by adjusting the throttle opening of the engine 2.

The work operation control unit 27 includes a predicting unit 50 configured to predict, on the basis of the engine speed of the engine 2 detected by the crank angle sensor 23, whether or not a load will lock the blades 6 serving as the work unit. In general, a garden or a field with grass has a mixture of a region with a high density of grass and a region with a low density of grass. Moreover, plants with thicker stems than grass or obstacles (for example, stones, rocks, dead trees, stumps, and the like) are possibly present in the garden or the field. When the amount of grass in contact with the blades 6 increases, the load applied on the engine 2 increases, thereby reducing the engine speed of the engine 2. Moreover, when an obstacle touches the blades 6, the engine speed of the engine 2 will be reduced to a halt of the engine 2. Such a state where the engine 2 is stopped is called "lock." Especially, in the technical field of the mowing machine 1, this phenomenon is called blade lock. When blade lock occurs, part of the blades 6 may be broken or chipped. Moreover, such blade lock also applies an excessively large load on parts of the engine 2, so that the parts are somehow adversely affected. Therefore, if the CPU 24 detects a predictive sign of blade lock, the CPU 24 switches the clutch 4 from the transmission state to the cut-off state. This makes it possible to reduce damage that the blades 6 or the engine 2 may receive.

The predicting unit 50 includes a reduction amount calculating unit 52 configured to calculate out a reduction amount $\Delta Ne$ of an engine speed Ne of the engine 2. For example, the reduction amount calculating unit 52 may be configured to sample the engine speed Ne of the engine 2 at a predetermined interval, and calculate out, as the reduction amount $\Delta Ne$, the difference between an engine speed Ne_i that is the engine speed sampled at the i-th time, and an engine speed Ne_i+1 that is the engine speed sampled at the i+1-th time. A lock determining unit 54 is configured to predict or determine that the work unit will become locked, when the reduction amount $\Delta Ne$ of an engine speed Ne of the engine 2 exceeds a first threshold th1. As such, the predictive sign of blade lock is detected by detecting that the reduction amount $\Delta Ne$ of an engine speed Ne of the engine 2 exceeds the first threshold th1. A clutch control unit 56 is configured to switch the clutch 4 to the cut-off state or keep the clutch 4 in the transmission state, depending on the prediction result (whether or not there is a predictive sign of lock) of the predicting unit 50, that is, the determination result (whether or not the reduction amount $\Delta Ne$ of the engine 2 exceeds the first threshold th1) of the lock determining unit 54. The prediction result of the predicting unit 50 may be supplied to the engine control unit 28 or the travel control unit 26. The fuel supply control unit 57 may be configured to control the fuel supply device 41 to stop the supply of the fuel to the engine 2 if the predicting unit 50 predicts that the work unit will become locked. The ignition control unit 58 may be configured to stop the supply of the electricity to the ignition device 42 if the predicting unit 50 predicts that the work unit will become locked. These configurations in which the engine 2 is stopped as such reduces damage to the engine 2.

The work operation control unit 27 may be configured such that, after the supply of the fuel to the engine 2 is stopped and the supply of the electricity to the ignition device 42 is stopped, the work operation control unit 27 causes the BSG 7 to operate as the power generator by utilizing inertial rotation of the crankshafts 3a and 3b of the engine 2, so that the 48-V battery 8 and the 12-V battery 11 will be charged with electricity generated by the power generator. This configuration improves power saving.

A load determining unit 55 may be configured to determine a load applied on the engine 2 on the basis of the reduction amount ΔNe. For example, the load determining unit 55 may be configured such that, if the reduction amount ΔNe is smaller than the first threshold th1 but larger than a second threshold th2, the load determining unit 55 causes the 48-V battery 8 to supply electricity to the BSG 7, so that the BSG 7 performs torque assistance to the engine 2. Because the first threshold th1 is larger than the second threshold th2, the reduction amount ΔNe first exceeds the second threshold th2, and then exceeds the first threshold th1. As described above, in the region with a high grass density, the blades 6 may become tangled with a large amount of grass, so that the load on the engine 2 increases, whereby the engine speed of the engine 2 decreases. Thus, if the load determining unit 55 detects an increase of the load, the load determining unit 55 causes the BSG 7 to switch over from the power generating mode to a torque assisting mode in order to assist the engine 2. This configuration makes it possible for a user to carry on mowing in such a region with a high grass density.

The travel control unit 26 may be configured to stop the travel motors 9 if the predicting unit 50 predicts that the work unit will become locked. Because the travel motors 9 are motors for the driving wheels, if the travel motors 9 are stopped, the rotation of the wheels 12 will be stopped, and the travelling of the mowing machine 1 also stops. This configuration facilitates the reduction of damage to the blades 6. Moreover, if the mowing machine 1 travels with the blades 6 stopped, some grass will be left uncut, but if the travelling of the mowing machine 1 is also stopped, such uncut grass can be prevented. Note that, the travel control unit 26 may be configured such that, if the predicting unit 50 predicts that the work unit will become locked, the travel control unit 26 causes the travel motors 9 to rotate in an opposite direction for a certain time period, such that the mowing machine 1 travels backward. This configuration makes it possible to move the mowing machine 1 away from the obstacle and to prevent uncut grass described above.

A slope calculating unit 53 may be optionally provided. The slope calculating unit 53 is configured to obtain the absolute value of a slope a of the engine speed Ne of the engine 2 detected when the engine speed of the engine 2 decreases. If the absolute value of the slope a is greater than a predetermined value tha1, the lock determining unit 54 predicts that the work unit will become locked. If the absolute value of the slope a is greater than a predetermined value tha2 but smaller than the predetermined value tha1, the load determining unit 55 predicts that the load is increasing. If the blades 6 touch an obstacle, the engine speed Ne will drop relatively suddenly. Moreover, if the blades 6 touch a large amount of grass, or if mowed grass becomes trapped between the blades 6 and a housing of the mowing machine 1, the engine speed Ne will drop relatively gradually. Therefore, by checking the slope a of the engine speed Ne, the predicting unit 50 can distinguish between whether the blades 6 have touched an obstacle or the blades 6 have come into contact with a large amount of grass or become clogged with grass.

Flowchart

Figure 4:
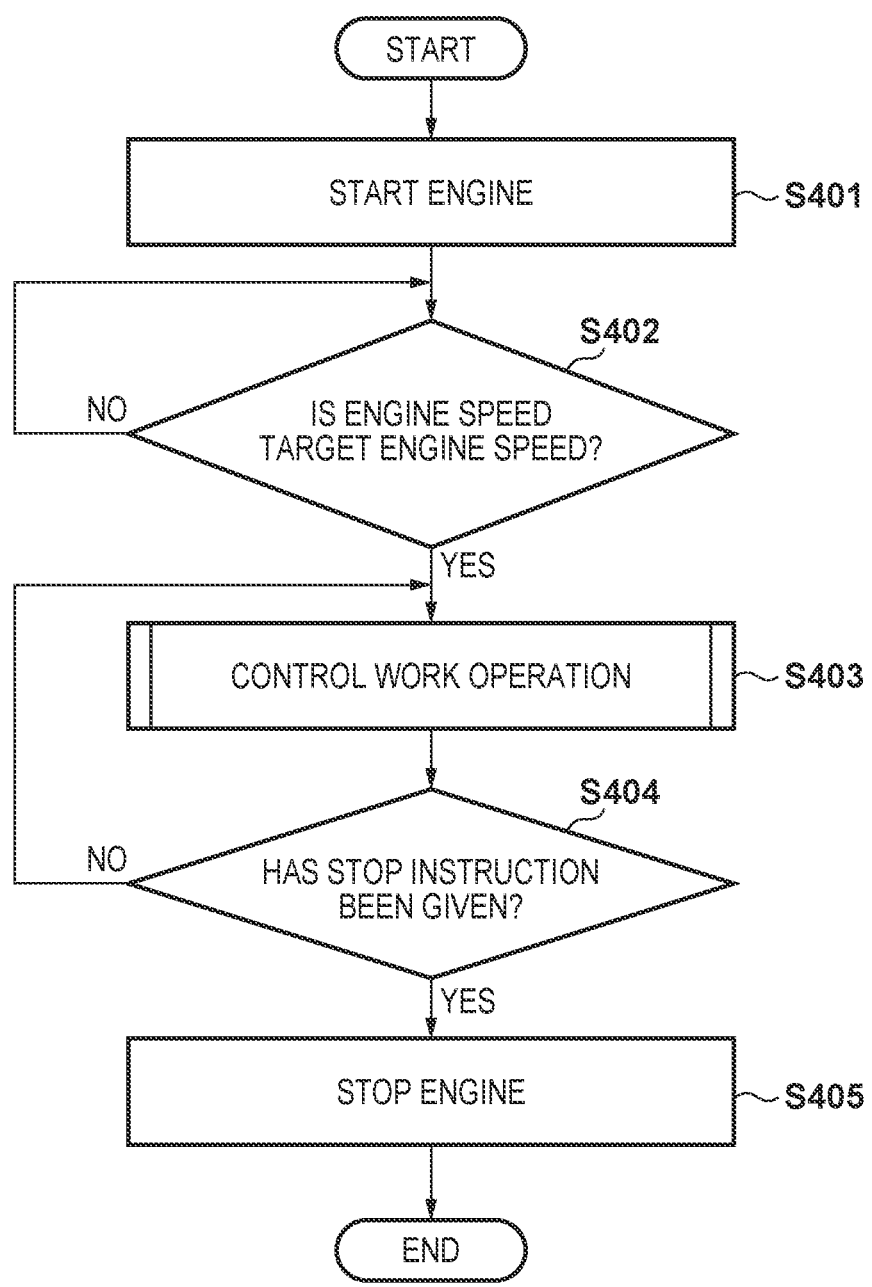
FIG. 4 is a flowchart illustrating a control method for the work machine.

FIG. 4 illustrates a control method executed by the CPU 24 according to a control program.

In S401, the CPU 24 (engine control unit 28) starts the engine 2 if the start of the engine 2 is instructed by a user. For example, the fuel supply control unit 57 starts the supply of the fuel to the engine 2 by controlling the fuel supply device 41. Moreover, the ignition control unit 58 causes the ignition device 42 to perform the ignition at an ignition timing.

In S402, the CPU 24 (engine control unit 28) determines whether the engine speed Ne has reached a target engine speed. This determining corresponds to determining whether or not the engine 2 can drive the blades 6. Moreover, the target engine speed is an engine speed faster than the engine speed at which the engine 2 can rotate in a self-sustainable manner. When the engine speed Ne reaches the target engine speed, the CPU 24 moves to S403. Note that, when the engine speed Ne reaches the target engine speed, the CPU 24 (load determining unit 55) sets the operation mode of the BSG 7 to the power generating mode.

In S403, the CPU 24 (work operation control unit 27) performs work operation control. Details of the work operation control will be described later, referring to FIG. 5.

In S404, the CPU 24 (engine control unit 28) determines whether or not the user gave an instruction to stop the engine 2. If the user has not given an instruction to stop the engine 2, the CPU 24 returns to S403 to continue the work control. However, if the user gave an instruction to stop the engine 2, the CPU 24 moves to S405.

In S405, the CPU 24 (engine control unit 28) causes the fuel supply device 41 to stop the supply of the fuel to the engine 2 and causes the ignition device 42 to stop the ignition, thereby causing the engine 2 to stop.

Figure 5:
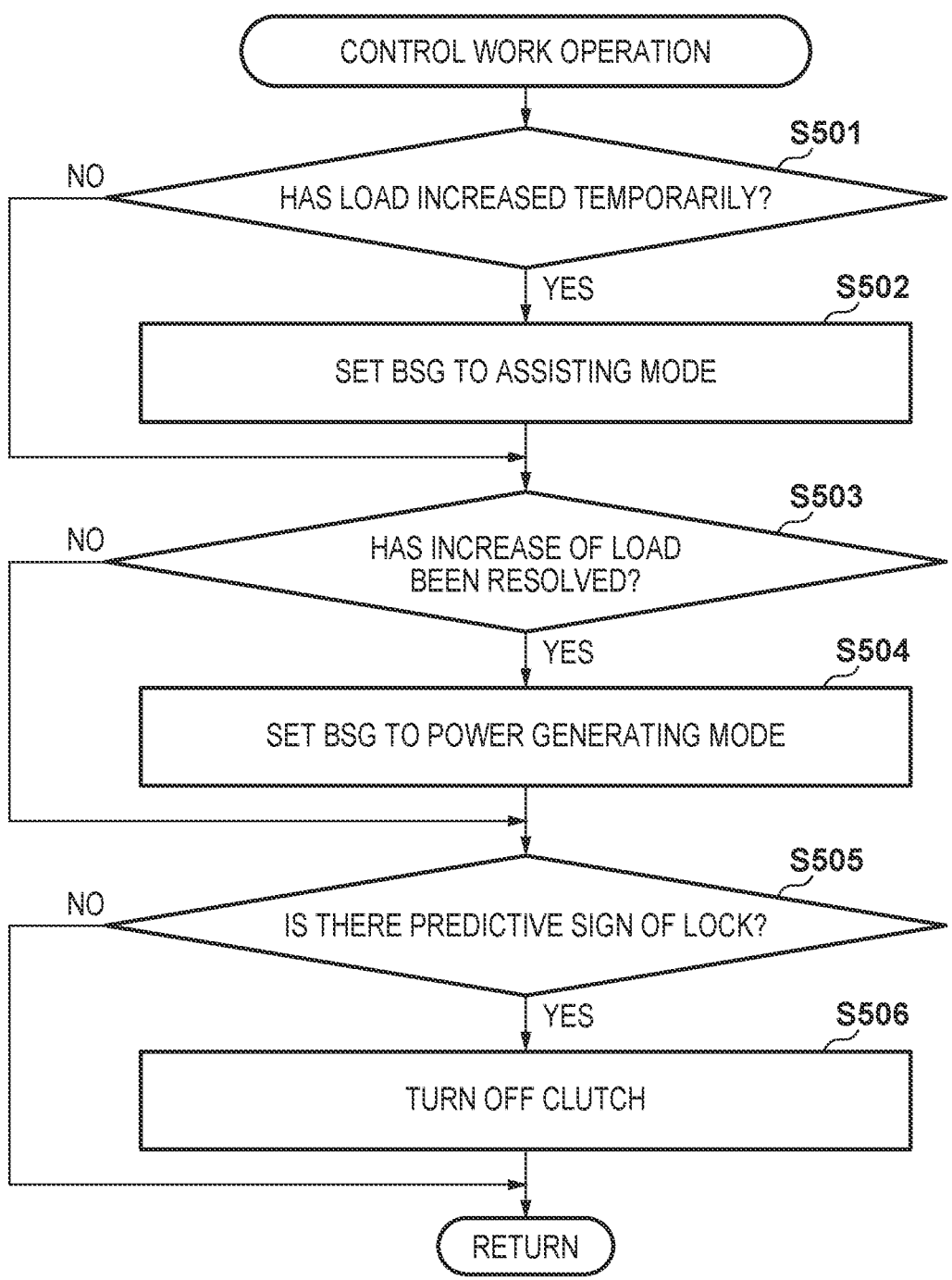
FIG. 5 is a flowchart illustrating work operation control in detail.

FIG. 5 is a flowchart illustrating details of the work operation control performed by the CPU 24 according to the control program.

In S501, the CPU 24 (load determining unit 55) determines, on the basis of the engine speed Ne, the reduction amount ΔNe, or the slope a, whether or not the load applied on the engine 2 has increased temporarily. If the load has temporarily increased as a result of the blades 6 touching a large amount of grass, the CPU 24 moves to S502. On the other hand, if the load has not increased temporarily, for example, if the load is steady, the CPU 24 moves to S503. For example, the load determining unit 55 may be configured such that, if the engine speed Ne has decreased to a predetermined engine speed or lower, the load determining unit 55 determines that the load has temporarily increased. The load determining unit 55 may be configured such that, if the reduction amount ΔNe exceeds the second threshold th2, the load determining unit 55 determines that the load has temporarily increased. The load determining unit 55 may be configured such that, if the slope a is negative and has an absolute value exceeding a predetermined value, the load determining unit 55 determines that the load has temporarily increased. A configuration is possible in which, if the batteries are sufficiently charged, the BSG 7 is set to the assisting mode regardless of how large or small the load is.

In S502, the CPU 24 (load determining unit 55) sets the operation mode of the BSG 7 to the torque assisting mode.

In S503, the CPU 24 (load determining unit 55) determines, on the basis of the engine speed Ne, the reduction amount ΔNe, or the slope a, whether or not the temporary increase of the load on the engine 2 has been resolved. If the torque assisting by the BSG 7 has resolved the temporary increase, the CPU 24 moves to S504. On the other hand, if the torque assisting by the BSG 7 has not resolved the temporary increase, the CPU 24 moves to S505. For example, the load determining unit 55 may be configured such that, if the engine speed Ne exceeds a predetermined engine speed, the load determining unit 55 determines that the temporary increase of the load has been resolved. The load determining unit 55 may be configured such that, if the reduction amount ΔNe has become equal to or less than the second threshold th2, the load determining unit 55 determines that the temporary increase of the load has been resolved. The load determining unit 55 may be configured such that, if the slope a become positive, the load determining unit 55 determines that the temporary increase of the load has been resolved. The load determining unit 55 may be configured such that, if the slope a is negative but has an absolute value equal to or less than a predetermined value, the load determining unit 55 determines that the temporary increase of the load has been resolved.

In S504, the CPU 24 (load determining unit 55) sets the operation mode of the BSG 7 to the power generating mode.

In S505, the CPU 24 (lock determining unit 54) determines, on the basis of the engine speed Ne, the reduction amount ΔNe, or the slope a, whether or not there is a predictive sign of lock. If locking of blades 6 is predicted, for example, due to the reduction amount ΔNe exceeding the first threshold th1, the CPU 24 moves to S506. If locking of blades 6 is not predicted, the CPU 24 skips S506. For example, the load determining unit 55 may be configured such that, if the engine speed Ne has become equal to or less than a predetermined engine speed, the load determining unit 55 determines that there is a predictive sign of lock. The load determining unit 55 may be configured such that, if the reduction amount ΔNe exceeds the first threshold th1, the load determining unit 55 determines that there is a predictive sign of lock. The load determining unit 55 may be configured such that, if the slope a is negative and the absolute value of the slope a exceeds another predetermined value, the load determining unit 55 determines that there is a predictive sign of lock.

In S506, the CPU 24 (clutch control unit 56) turns off the clutch 4. That is, the clutch control unit 56 switches over the clutch 4 from the transmission state (ON) to the cut-off state (OFF).

SUMMARY

According to a first aspect, provided is a work machine, configured by including: an engine 2; a work unit configured to be driven by the engine 2; a clutch 4 provided between an output shaft of the engine 2 and a power shaft of the work unit, and configured to transmit or cut off power from the output shaft of the engine 2 to the power shaft; a sensor (for example, a crank angle sensor 23) configured to detect an engine speed of the engine 2; and a control unit 10 configured to control the engine 2 and the clutch 4 on the basis of the engine speed Ne of the engine 2. The control unit 10 is configured to predict, on the basis of the engine speed Ne of the engine 2 detected by the sensor, whether or not the work unit will become locked by a load. Furthermore, the control unit 10 includes a clutch control unit 56 configured to control the clutch 4 to switch over from a transmission state to a cut-off state if the predicting unit 50 predicts that the work unit will become locked. With this configuration in which the clutch 4 cuts off the engine 2 from the work unit if it is predicted that the work unit will become locked, damage to the work unit or parts of the engine 2 is reduced.

According to a second aspect, if a reduction amount ΔNe of the engine speed Ne of the engine 2 detected by the sensor is greater than a first threshold th1, the predicting unit 50 predicts that the work unit will become locked. In a state where the work unit may become locked, the load applied on the work unit suddenly increases, which suddenly reduces the engine speed Ne. Thus, due to the control unit 10 paying attention to the reduction amount ΔNe, locking can be predicted accurately.

According to a third aspect, the BSG 7 is one example of a power generator/motor configured to drive the output shaft of the engine 2 and to generate electricity by being driven by the engine 2 that is being driven. The 48-V battery 8 is one example of a battery configured to be charged with the electricity generated by the power generator/motor when the power generator/motor operates as a power generator, and to supply the electricity to the power generator/motor when the power generator/motor operates as a motor. If the reduction amount ΔNe of the engine speed of the engine 2 detected by the sensor is smaller than the first threshold th1 but becomes larger than a second threshold th2, the control unit 10 causes the battery to supply electricity to the power generator/motor, so as to cause the power generator/motor to assist the engine 2. With this configuration in which the BSG 7 or the like assists the engine 2 under the increase of load that is not large enough to cause locking, it is possible for the work machine to carry on the work. Note that the prediction of locking may be carried out while assisting is performed. If the engine speed of the engine 2 still decreases even though the BSG 7 assists the torque of the engine 2, there is a high possibility that the work unit will become locked. Therefore, the control unit 10 may be configured such that, if the engine speed of the engine 2 still decreases even though the BSG 7 assists the torque of the engine 2, the control unit 10 determines that locking may occur. This configuration makes it possible to detect the locking of the work unit with good accuracy.

According to a fourth aspect, the fuel supply device 41 is one example of a supply unit configured to supply fuel to the engine 2. The fuel supply device 41 may include a fuel injection device for injecting the fuel into an intake port or combustion chamber of the engine 2. The ignition device 42 is one example of an ignition device (for example, a plug or the like) provided for the engine 2. If the predicting unit 50 predicts that the work unit will become locked, the control unit 10 causes the supply unit to stop the supply of the fuel to the engine 2 and stops the supply of electricity to the ignition device 42. With this configuration, the occurrence of locking can be prevented, or the extent of locking that may occur can be alleviated.

According to a fifth aspect, the control unit 10 may be configured such that, if the predicting unit 50 predicts that the work unit will become locked, the control unit 10 causes the supply unit to stop the supply of fuel to the engine 2 and stops the supply of electricity to the ignition device 42, and thereafter the control unit 10 causes the power generator/motor to operate as a power generator by utilizing inertial rotation of the output shaft of the engine 2 so as to charge the battery with the electricity generated by the power generator. The crankshafts 3a and 3b are connected to a counter weight or the like, so that inertial rotation of the crankshafts 3a and 3b continues even if the supply of fuel stops. Thus, by causing the BSG 7 to generate electricity by utilizing the inertial rotation of the engine 2, regenerative charging of the battery is realized. Moreover, the BSG 7 performing the power generation becomes a load on the engine 2, and thus the inertial rotation of the engine 2 can be brought to a halt in a shorter period.

According to a sixth aspect, the wheels 12 are examples of driving wheels. The travel motors 9 are one example of driving wheel motors configured to rotate the respective driving wheels. The control unit 10 may be configured such that, if the predicting unit 50 predicts that the work unit will become locked, the control unit 10 stops the driving wheel motors. When it is predicted that the work unit will become locked, there is a high possibility that the work unit has touched a foreign object. Moreover, the work machine performs work on the work target while the work machine is travelling. Moreover, even when the clutch 4 is in the off state, the work unit is rotated by inertia. Therefore, if the work machine continues the travelling even after the work machine has touched a foreign object, damage to the work unit will worsen. Thus, with this configuration in which the travelling of the work machine is stopped as such, the damage that the work unit would receive can be reduced.

According to a seventh aspect, the predicting unit may be configured such that, if the engine speed of the engine 2 decreases, the predicting unit obtains an absolute value of a slope a of the engine speed of the engine 2 detected by the sensor, and if the absolute value of the slope a is greater than a predetermined value tha1, the predicting unit predicts that the work unit will become locked. If the work unit has touched a foreign object, the load suddenly increases. If the work unit has touched a large amount of work target, the load gradually increases. Therefore, the configuration that pays attention to the slope a of the engine speed Ne makes it possible for the control unit 10 to determine, with good accuracy, whether or not the increase of the load is a predictive sign of lock.

According to an eighth aspect, the predicting unit 50 may be configured such that, if the absolute value of the slope a is greater than the predetermined value, the predicting unit 50 determines that the work unit has touched a foreign object, and if the absolute value of the slope is not greater than the predetermined value, the predicting unit 50 determines that the work unit has touched a large amount of work target. This configuration makes it possible for the control unit 10 to determine, with good accuracy, whether or not the increase of the load is a predictive sign of lock. Further, the control unit 10 may be configured such that, if the predicting unit determines that the work unit has touched a foreign object, the control unit 10 controls the clutch to switch over from the transmission state to the cut-off state, stops the supply of fuel to a supply unit configured to supply the fuel to the engine, and stops the supply of electricity to an ignition device provided for the engine. This configuration alleviates damage to the work unit.

According to a ninth aspect, the work unit may be blades 6 for mowing grass. In other words, the work machine may be a mowing machine 1.

According to a tenth aspect, the work unit may be a rotary for plowing soil. In other words, the work machine may be a cultivator.

According to an eleventh aspect, the work unit may be an auger for raking away snow. In other words, the work machine may be a snowplow.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A work machine, comprising:
   an engine;
   a rotatable member configured to be driven by the engine;
   a clutch provided between an output shaft of the engine and a power shaft of the rotatable member, and configured to transmit or cut off power from the output shaft of the engine to the power shaft;
   a sensor configured to detect an engine speed of the engine; and
   a control unit configured to control the engine and the clutch based on the engine speed of the engine,
   wherein the control unit includes:
      a predicting unit configured to predict, based on the engine speed of the engine detected by the sensor, whether or not the rotatable member will become locked by a load; and
      a clutch control unit configured to control the clutch to switch over from a transmission state to a cut-off state in response to the predicting unit predicting that the rotatable member will become locked,
   wherein in a case where a reduction amount of the engine speed of the engine detected by the sensor is greater than a first threshold, the predicting unit predicts that the rotatable member will become locked, and
   the work machine further comprising:
      a power generator/motor configured to drive the output shaft of the engine and to generate electricity by being driven by the engine that is being driven; and
      a battery configured to be charged with electricity generated by the power generator/motor when the power generator/motor operates as a power generator, and to supply electricity to the power generator/motor when the power generator/motor operates as a motor,
   wherein in a case where the reduction amount of the engine speed of the engine detected by the sensor is smaller than the first threshold but becomes larger than a second threshold, the control unit causes the battery to supply electricity to the power generator/motor, so as to cause the power generator/motor to assist the engine.

2. The work machine according to claim 1, further comprising:
   a supply unit configured to supply fuel to the engine; and
   an ignition device provided for the engine,
   wherein in a case where the predicting unit predicts that the rotatable member will become locked, the control unit causes the supply unit to stop the supply of the fuel to the engine and stops the supply of electricity to the ignition device.

3. The work machine according to claim 2, wherein in a case where the predicting unit predicts that the rotatable member will become locked, the control unit causes the supply unit to stop the supply of the fuel to the engine and stops the supply of electricity to the ignition device, and thereafter the control unit causes the power generator/motor to operate as a power generator by utilizing inertial rotation of the output shaft of the engine so as to charge the battery with the electricity generated by the power generator.

4. The work machine according to claim 1, wherein the rotatable member is a blade for mowing grass.

5. The work machine according to claim 1, wherein the rotatable member is a rotary for plowing soil.

6. The work machine according to claim 1, wherein the rotatable member is an auger for raking away snow.

7. A work machine, comprising:
an engine;
a rotatable member configured to be driven by the engine;
a clutch provided between an output shaft of the engine and a power shaft of the rotatable member, and configured to transmit or cut off power from the output shaft of the engine to the power shaft;
a sensor configured to detect an engine speed of the engine; and
a control unit configured to control the engine and the clutch based on the engine speed of the engine,
wherein the control unit includes:
  a predicting unit configured to predict, based on the engine speed of the engine detected by the sensor, whether or not the rotatable member will become locked by a load; and
  a clutch control unit configured to control the clutch to switch over from a transmission state to a cut-off state in response to the predicting unit predicting that the rotatable member will become locked,
  wherein in a case where a reduction amount of the engine speed of the engine detected by the sensor is greater than a first threshold, the predicting unit predicts that the rotatable member will become locked, and
the work machine further comprising:
  a driving wheel; and
  a driving wheel motor configured to rotate the driving wheel,
  wherein in a case where the predicting unit predicts that the rotatable member will become locked, the control unit stops the driving wheel motor.

8. A work machine, characterized by comprising:
an engine;
a rotatable member configured to be driven by the engine;
a clutch provided between an output shaft of the engine and a power shaft of the rotatable member, and configured to transmit or cut off power from the output shaft of the engine to the power shaft;
a sensor configured to detect an engine speed of the engine; and
a control unit configured to control the engine and the clutch based on the engine speed of the engine,
the control unit including:
  a predicting unit configured to predict, based on the engine speed of the engine detected by the sensor, whether or not the rotatable member will become locked by a load; and
  a clutch control unit configured to control the clutch to switch over from a transmission state to a cut-off state in response to the predicting unit predicting that the rotatable member will become locked, wherein
  in a case where the engine speed of the engine decreases, the predicting unit obtains an absolute value of a slope of the engine speed of the engine detected by the sensor, and
  in a case where the absolute value of the slope is greater than a predetermined value, the predicting unit predicts that the rotatable member will become locked.

9. The work machine according to claim 8, wherein
in a case where the absolute value of the slope is greater than the predetermined value, the predicting unit determines that the rotatable member has touched a foreign object, and
in a case where the predicting unit determines that the rotatable member has touched a foreign object, the control unit controls the clutch to switch over from the transmission state to the cut-off state, stops a supply of fuel to a supply unit configured to supply fuel to the engine, and stops a supply of electricity to an ignition device provided for the engine.

10. A work machine, comprising:
an engine;
a rotatable member configured to be driven by the engine;
a clutch provided between an output shaft of the engine and a power shaft of the rotatable member, and configured to transmit or cut off power from the output shaft of the engine to the power shaft;
a sensor configured to detect an engine speed of the engine;
a control unit configured to control the engine and the clutch based on the engine speed of the engine;
a driving wheel; and
a driving wheel motor configured to rotate the driving wheel,
wherein the control unit comprises
  a predicting unit configured to predict, based on the engine speed of the engine detected by the sensor, whether or not the rotatable member will become locked by a load, and
  a clutch control unit configured to control the clutch to switch over from a transmission state to a cut-off state in response to the predicting unit predicting that the rotatable member will become locked, and
wherein, in a case where the predicting unit predicts that the rotatable member will become locked, the control unit stops the driving wheel motor.

* * * * *